United States Patent [19]

Bowman et al.

[11] 4,441,607
[45] Apr. 10, 1984

[54] MODE CHANGING MEANS FOR ACCUMULATOR CONVEYORS

[75] Inventors: Clyde L. Bowman; Charles R. DeVries, both of Grand Rapids; Charles W. Saur, Sparta, all of Mich.

[73] Assignee: Lear Siegler, Inc., Grand Rapids, Mich.

[21] Appl. No.: 299,320

[22] Filed: Sep. 4, 1981

[51] Int. Cl.³ .............................................. B65G 13/06
[52] U.S. Cl. ..................................... 198/781; 198/790
[58] Field of Search ....................... 198/781, 790, 955; 187/8.71, 8.72

[56] References Cited

U.S. PATENT DOCUMENTS

| | | | |
|---|---|---|---|
| 3,317,004 | 5/1967 | Harrison | 187/8.72 |
| 4,088,224 | 5/1978 | Kittredge | 198/790 |
| 4,238,029 | 12/1980 | Pirro | 198/781 |
| 4,273,239 | 6/1981 | Thwaites et al. | 198/781 |
| 4,344,527 | 8/1982 | Vogt et al. | 198/781 |

Primary Examiner—Robert J. Spar
Assistant Examiner—Jonathan D. Holmes
Attorney, Agent, or Firm—Price, Heneveld, Huizenga & Cooper

[57] ABSTRACT

An accumulator conveyor having an endless driven propelling member has a vertically adjustable support for said propelling member. The support has a stationary lower member and a vertically movable upper member divided into a plurality of segments arranged in tandem with two or more actuators supporting each segment of the upper member on said lower member. Each actuator has a hinged connection to both the upper and lower members and means to limit variation in the spacing between the plates. An expander is mounted on each actuator for forcibly separating the upper plate and actuator and lifting the upper plate as it pivots the actuator about its hinged connection to both the upper and lower plates. Separating the plates lifts the propelling member into conveying mode.

11 Claims, 13 Drawing Figures

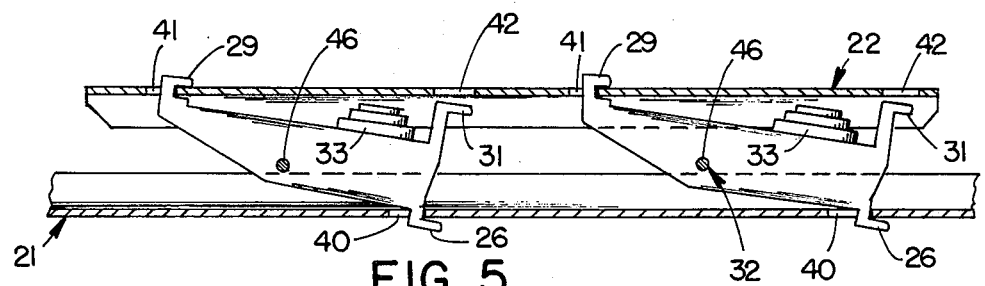
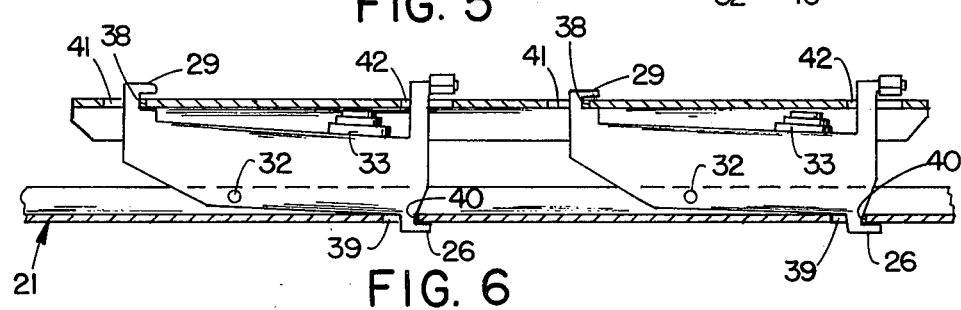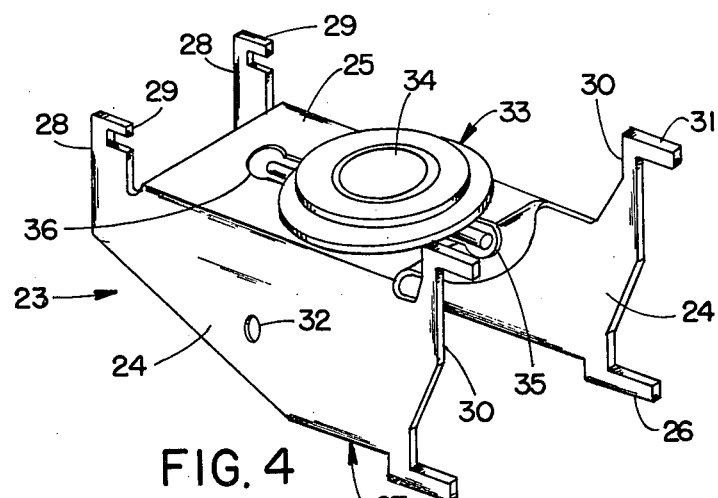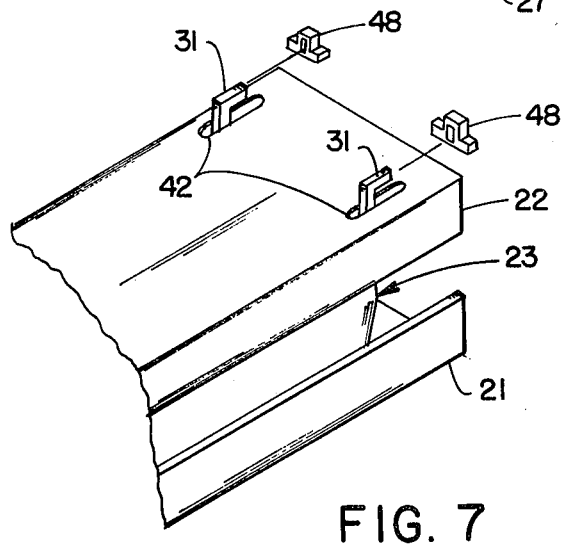

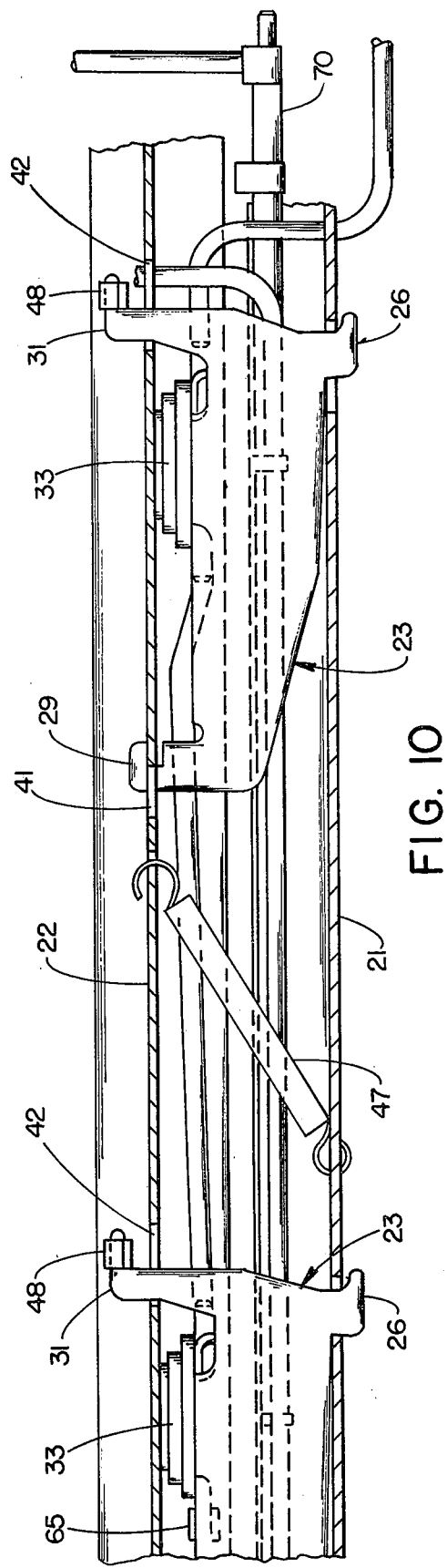
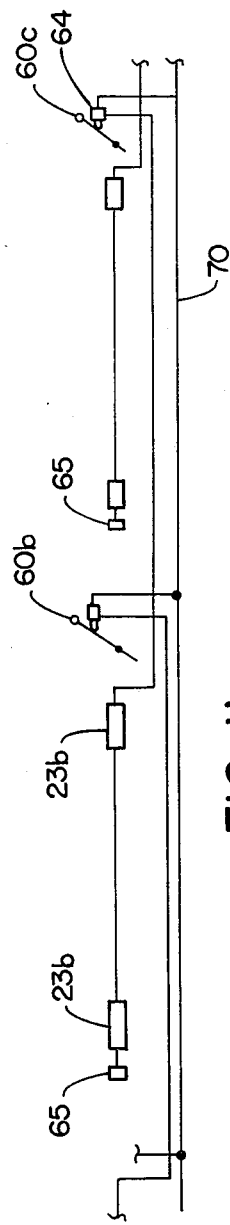
FIG. 10
FIG. 11

MODE CHANGING MEANS FOR ACCUMULATOR CONVEYORS

FIELD OF THE INVENTION

This invention relates to conveyors and more particularly to the operating mechanism for an accumulator conveyor of the type in which the propelling member is shifted vertically to shift the conveyor between conveying and accumulation modes.

BACKGROUND OF THE INVENTION

Since the initial introduction of accumulator conveyors of the automatic type in which the operation of the conveyor to shift it between conveying and accumulation mode is automatically controlled by means of mechanisms responsive to the presence of articles on the conveyor, a wide variety of such mechanisms have been developed. When accumulation mechanisms were first introduced, the operating speeds of this type of conveyor was relatively slow compared to the speed now demanded of such conveyors. As the speed of operation of the conveyors has increased, the problem of reduction of noise resulting from the operating mechanisms of the conveyor has become increasingly serious. While various constructions have been developed to reduce the incident of noise, these have resulted in increased complexity and initial cost. These mechanisms have also not necessarily addressed the problem of an accumulator having the requisite sensitivity to be fully and dependably responsive to a wide range of article weights and sizes. It has been the experience of the conveyor industry that these varying demands have tended to impose conflicting requirements upon accumulator design. The invention provides substantial improvement in these various categories and an accumulator of a new and different construction.

BRIEF DESCRIPTION OF THE INVENTION

The propelling member for this accumulator is supported from beneath by a vertically adjustable support consisting of upper and lower plates with the upper plates supported on the lower plates by means of two or more actuators. Each actuator includes means which expands and contracts to vary the distance between the upper and lower plates. The vertical position of the lower plate is fixed. Thus, it is the upper plate that shifts. The propelling member is supported on the upper plate and thereby its vertical position is changed. The construction of the actuators is such that this shift in vertical position is accomplished with little or no accompanying noise. Further, the entire support mechanism can be assembled without use of fasteners. Thus, it can be assembled or disassembled quickly and without tools. Further, the absence of fasteners eliminates the problem of the various connections and parts of the assembly becoming inadvertently separated because of fastener failure due to wear, vibration or fatigue. The unit can be made sufficiently sensitive that the conveyor is assured of positive operation, even though the articles being transported are of a wide range of weights and sizes.

BRIEF DESCRIPTION OF THE DRAWINGS

FIG. 4 is an oblique view of the actuator for this invention;

FIG. 5 is a sectional elevation view taken along the plane V—V of FIG. 2 illustrating the actuators in an intermediate stage of installation;

FIG. 6 is a view similar to FIG. 5 showing the actuators after the installation has been completed;

FIG. 7 is a fragmentary, oblique, partially exploded view of the support assembly;

FIG. 10 is a fragmentary, enlarged sectional elevation view of the support assembly with the fluid lines installed;

FIG. 11 is a fragmentary, schematic diagram of the fluid lines for operating the accumulator.

BRIEF DESCRIPTION OF THE PREFERRED EMBODIMENT

Figure 1:
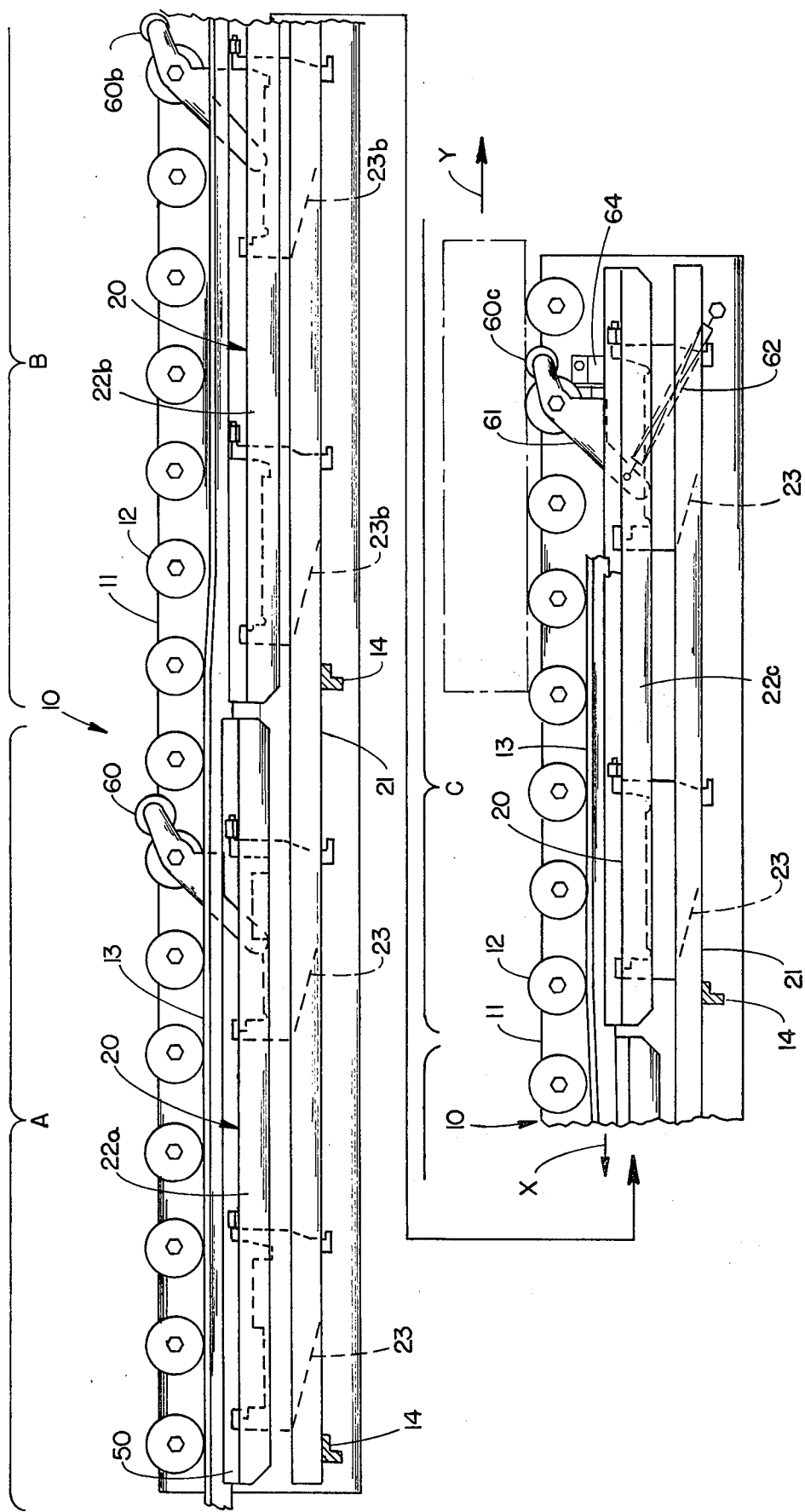
FIG. 1 is a fragmentary, sectional elevation view of a conveyor incorporating this invention.

Referring to FIG. 1, the numeral 10 indicates an accumulator conveyor having a standard frame 11 consisting of a pair of rails supporting a plurality of rollers 12 forming an article conveying surface. The side members of the frame 11 are joined by cross members 14. The rollers are powered by a propelling member 13 which, in turn, is supported by a plurality of adjustable support assemblies 20 arranged in tandem along the conveyor. The propelling member 13 may be of any suitable type such as a flat belt, a V-belt or a padded chain, the latter being the type of propelling member illustrated.

The support assembly 20 has an elongated lower beam or plate member 21 and a plurality of upper plate members 22 of which three are illustrated in FIG. 1 and identified as 22a, 22b and 22c. The lower plate member 21 is mounted on the cross members 14 and is vertically stationary. The number of upper beam sections or plate members 22 utilized on a particular conveyor is governed by the length of the conveyor. The upper plates 22 are vertically spaced from the lower plate 21 by actuators 23 seated between the plate members. In the particular construction illustrated, two of the actuators 23 are provided to support each upper plate section 22. However, it will be understood that additional actuators 23 may be employed, depending upon the length of the plate sections, this latter being dependent upon the length of the articles to be transported by the conveyor.

Figure 8:
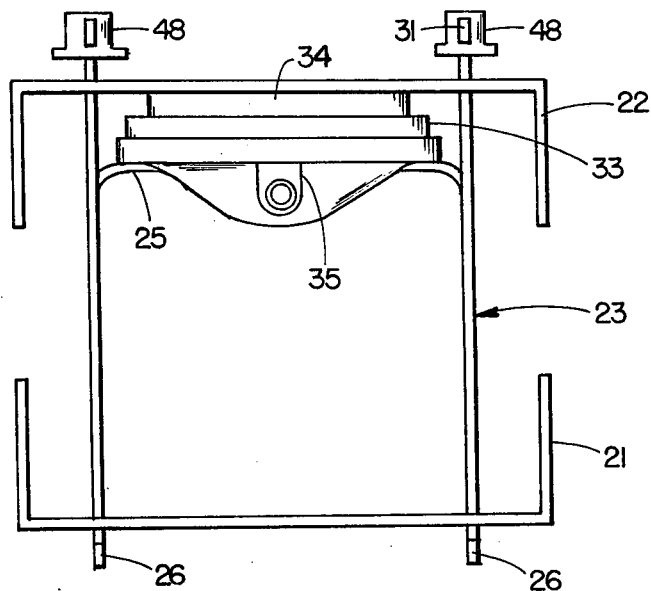
FIG. 8 is an end view of one of the supports in retracted position.
Figure 9:
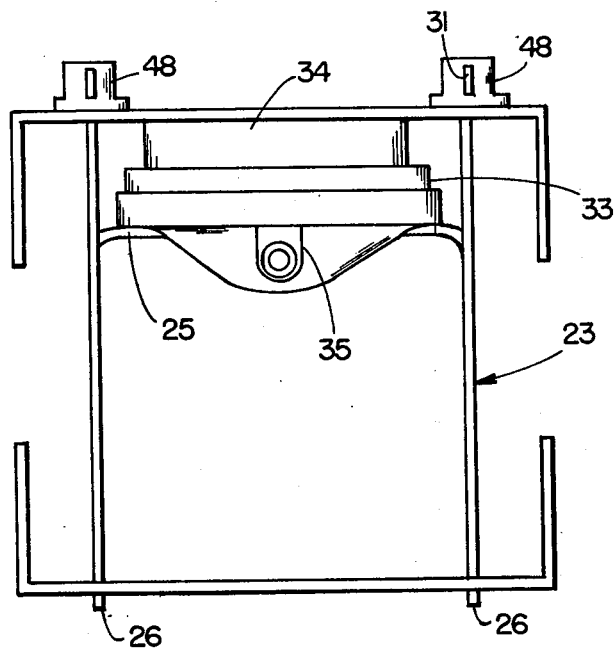
FIG. 9 is a view similar to FIG. 8 showing the support in expanded position.

The construction of the actuators 23 is best seen in FIGS. 2 through 7. Each actuator bracket has a unitary body member consisting of a pair of sides 24 joined by a web 25 which serves as a platform intermediate the top and bottom of the actuator. Thus, when the actuator is viewed from one end, it is of a generally H-shape (FIGS. 8 and 9). Each side, at its forward end, has a dependent, forwardly extending footpiece 26. Rearwardly of the footpiece 26, the lower edges 27 of the sides are straight with the rearward portions thereof being upwardly inclined. The bracket terminates at the rear in an upstanding post 28 having a forwardly opening slot near its top end forming a second hook 29. The hook forming slots are spaced well above the top surface of the platform 25.

At the forward end of each side, an upstanding hook 30 is provided. The hooks each have a forwardly extending finger portion 31. The hooks 30 project further above the top surface of the platform 25 than the posts 28 for reasons which will be explained subsequently. Somewhat rearward of the center point between the front and back of the actuator, a hole 32 is provided in each of the sides, the holes being aligned. The purpose of these holes will be explained subsequently.

Seated on and secured to the platform 25, adjacent the forward end of the actuator, is a fluid operated expander 33 having a diaphragm type bellows 34 in its upper face. The platform is recessed in front of the expander at 35 rearwardly of the expander at 36 to permit installation of fluid hoses for actuation of the expander 33.

Figure 2:
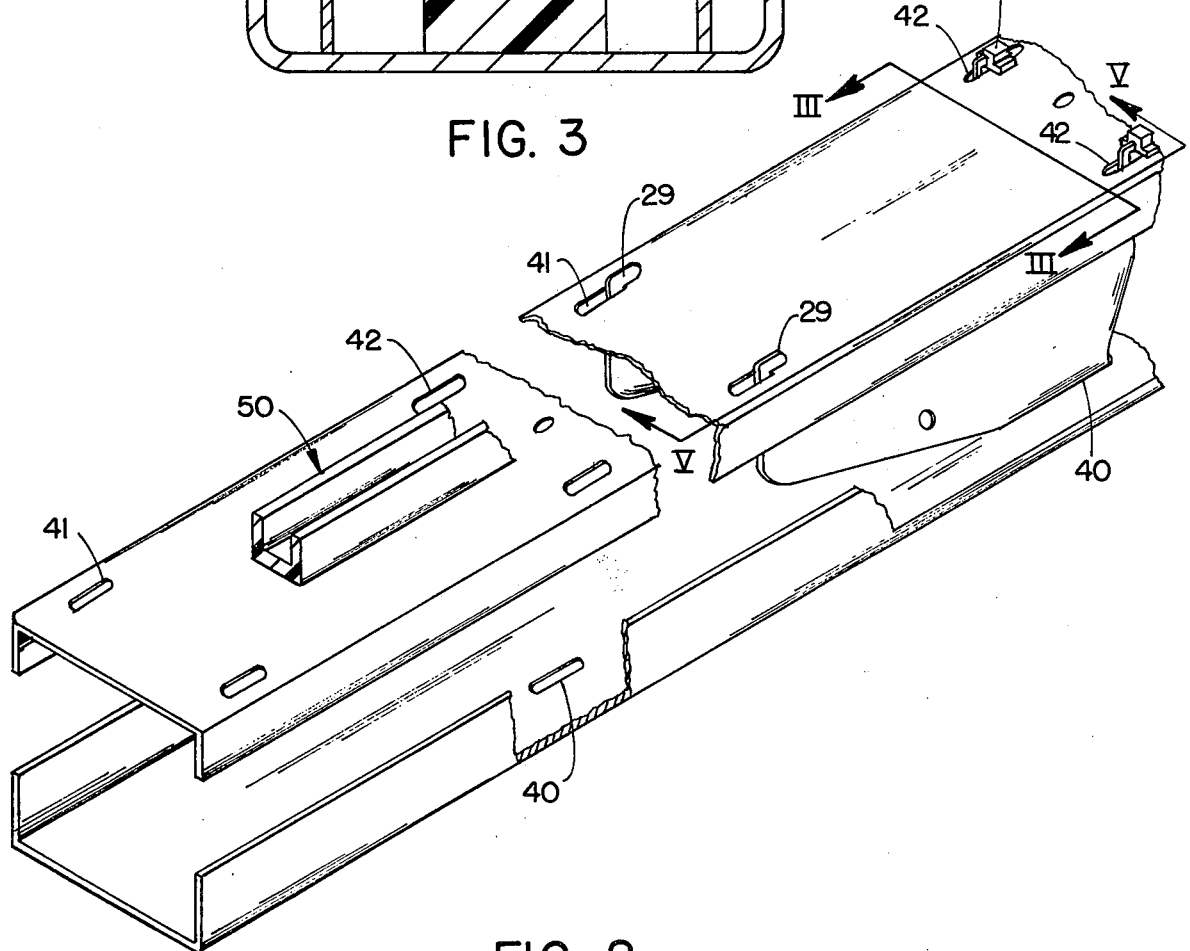
FIG. 2 is a fragmentary, oblique view of the propelling member support incorporating this invention.

The lower beam or plate 21 is provided with pairs of elongated slits 40, the slits of each pair being aligned laterally of the plate (FIGS. 2, 5 and 6). The slits lengthwise of the plate, are spaced in accordance with the spacing between the actuators. The slits 40 are of a length that permits the forward footpieces 26 to pass through them. In a similar manner, the upper plate 22 is provided with similarly spaced elongated slits 41 and 42 to receive the rear hooks 29 and the upper forward hooks 30 respectively (FIGS. 2, 5 and 6). Again, the spacing is such as to accommodate the actuators, the arrangement being such that the hooks 29 and footpieces 26 are at the forward limit of movement within their respective slots when the upper forward hooks 31 are aligned with their respective slots in the upper plate 22 (FIGS. 5 and 6). In this position the forwardly extending portions of these hooks overlap the surfaces of their respective plates.

With this arrangement, simply by allowing the actuator to rock back until it is seated on the bottom plate, the forward hooks will be in position to pass upwardly through their respective openings 41. In making the assembly, the actuators are first assembled to the lower plate 21 by securing the footpieces 26 in their openings 40 and the actuators moved forwardly as far as possible. A rod 46 is then inserted through the openings 32 with the end of the rod projecting over the sides of the lower plate. This holds the actuators with their rearward ends pivoted upwardly as shown in FIG. 5. The upper plate 22 is then mounted over the rear hooks 29 as indicated in FIG. 5 and the spring 47 is installed (not illustrated in FIGS. 5 and 6). The rods 46 are then removed permitting the actuators to rock rearwardly under the tension of the spring 47 (FIG. 10). In doing so, the forward upper hooks pass upwardly through the slots 42. The rearward rocking motion is limited by the bind between the actuators and the upper plate 22 which occurs when the top of the expander 33 seats against the inside surface of the upper plate and the forwardly extending fingers of the hooks 29 seat against the upper surface of the upper plate. The spring 47 forces the upper plate 22 to maintain contact with the rear end of the slot of the hook 29 forming a pivot or hinge point 38. When this occurs, the actuators are slightly upwardly and rearwardly inclined and thus the lower edges 27 of the actuator sides do not seat on the lower plate 21 except at their junction with the footpieces 26 forming a second pivot or hinge point 39. Thus, as the expanders 33 are actuated and extended, the upper plate 21 rises as the actuator pivots about the hinge points 38 and 39.

The assembly is completed by inserting a lock or stop member 48 on the forward end of each of the upper forward hooks as indicated in FIGS. 6 and 7. The lock members 48 have a lower footpiece wider than the slot 42, thus preventing the hooks 31 from passing downwardly through the slots. It will be noted from FIG. 8 that, in this position, the upper plate 22 rests on the top of the contracted bellows 34 of the expander 33. In this condition, there is a space between the top surface of the upper plate 22 and the bottoms of the stops 48 (FIG. 8).

Figure 3:
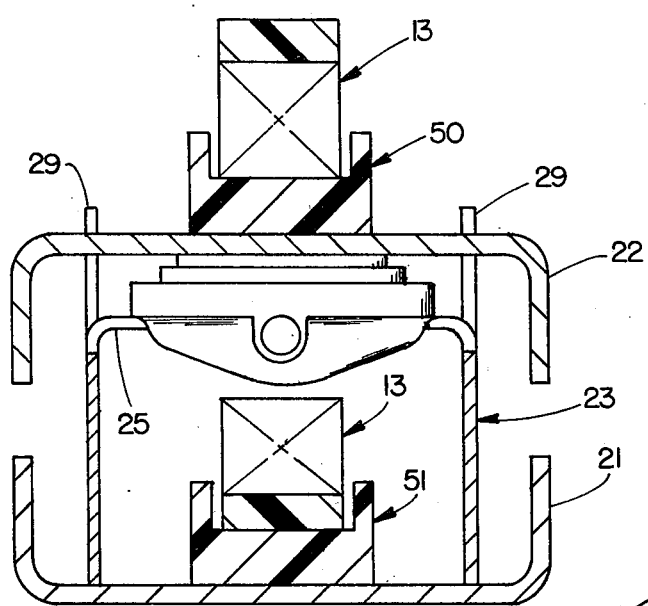
FIG. 3 is a sectional elevation view taken along the plane III—III of FIG. 2.

Mounted on top of each of the top plates 22 is a propelling member guideway 50 (FIGS. 1, 2 and 3). The shape, size and format of the guideway will be dependent upon the particular type of propelling member utilized. In the particular construction illustrated, since a padded chain is utilized, the guideway 50 is relatively narrow. If a different type of propelling member was utilized, the shape of the guideway will be changed accordingly. The guideway is preferably molded of a suitable plastic having a lubricious surface such as Delren or nylon. A similar guideway 51 is provided along the center of the lower plate 21 (FIG. 3). It, however, differs from the upper guideway in that it can be continuous rather than being in sections of a length identical to that of the upper plates. The propelling member 13 is an endless member continuously driven by any suitable conventional means, not illustrated.

The conveyor has a plurality of zones, arranged in tandem. Each zone extends the length of one of the upper plates 22. FIG. 1 illustrates three zones A, B and C. For each zone along the accumulator conveyor such as the zones A, B and C, an article sensor 60 is provided (FIG. 1). Each article sensor preferably is a roller supported on a pivoted bracket 61 biased by a spring 62 into a position supporting the roller 60 slightly above the conveying surface formed by the rollers 12. Associated with each sensor 60 is a fluid valve 64. Because of the bias of the spring 62 when the roller 60 is in raised position, the valve 64 is normally held open. The valve 64 associated with a sensor 60 at one end of one of the zones is interconnected to the expanders 33 for the actuators in the next adjacent upstream zone. The fluid line supplying the expanders in each zone is capped at the end by a plug 65. Thus, as illustrated in FIG. 1, with the propelling member driven in the direction of arrow X, the articles will be propelled in the direction of arrow Y, the sensor 60c at the discharge end of the zone C is connected to the expanders 33 of the actuators 23b in zone B as is indicated schematically in FIGS. 1 and 11. In turn, the sensor 60b at the discharge end of zone B is interconnected to the expanders in zone A. Each valve 64 obtains fluid under pressure from a common conduit 70. The fluid can be either pneumatic or hydraulic. The particular equipment illustrated is specifically designed for pneumatic operation. The source of the fluid and the means for placing it under pressure are both conventional and are not illustrated.

Figure 12:
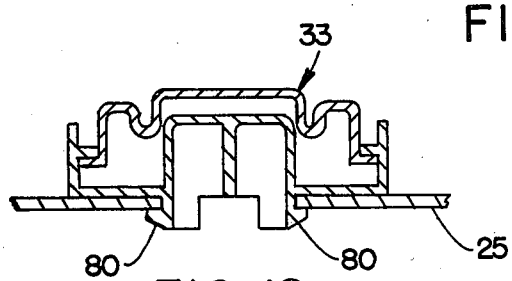
FIG. 12 is a sectional view of one of the expanders.
Figure 13:
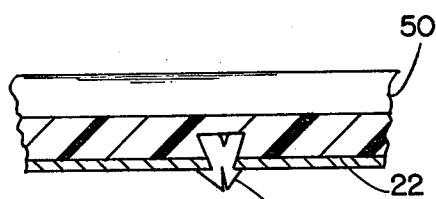
FIG. 13 is a fragmentary sectional view of one means for securing the propelling member guideway to the actuators.

One of the objectives of this invention is to provide a product the assembly of which requires no conventional fasteners. An example of this is illustrated in FIG. 12 which is a cross section through one of the expanders. It will be noted from this figure that the bottom of the expander is provided with a pair of anchor lugs 80 designed to be pressed through a hole in the platform 25. Once pressed through the platform they lock the expander in place. In a similar manner, any suitable means can be used to secure the propelling member guide 50 to the upper plate 22 such as the plastic insert device 81. This would be the technique used if the guide 50 is extruded. If the guide 50 is molded, then the connector 81 can be molded integral with the guide itself. This type of arrangement provides a trouble-free type of assembly which is not subject to failure due to fasteners becoming loosened, sheared or otherwise inoperative.

OPERATION

When no air is admitted to the expanders 33, they contract, resulting in the downward rocking of the actuators 23 and lowering of the upper plate section 22. This also lowers the propelling member resulting in disengagement of the conveying rollers 12 and shifting the affected section of the conveyor to accumulation mode. To initiate operation of the conveyor, the fluid supply line 70 is pressurized and because of the absence of articles on the conveyor, all of the sensors 60 being in raised position, all of the expanders will be caused to expand. This lifts the upper plate sections 22 and thus the propelling member into drive position. As the articles move along the conveyor in the direction of the arrow Y in FIG. 1, passing of the lead article over the first sensor 60 will trip the sensor thus closing the associated valve 64 resulting in termination of the air supply to the expanders of the actuators in the next adjacent upstream zone. If the article moves along in normal fashion, this will only be momentary because the sensor will be released as soon as the article has moved on once again opening the associated valve 64. If, however, the article remains stalled while resting on the sensor, the continued absence of pressurized fluid to the expanders of the next upstream zone will result in that zone remaining inactive and the next article approaching from the upstream side, on entering the zone, will be deprived of drive force and thus be accumulated on the conveyor. As it does so, it will depress the sensor 60 in that zone resulting in the next upstream zone being deactivated. This reaction will repeat progressively upstream until either no more articles approach this particular portion of the conveyor or the lead article is permitted to resume its forward motion. When this happens, as soon as the forward article releases its sensor, pressure will be restored to the expanders in the next upstream zone resulting in resumption of forward motion of the article in that zone. As it releases its sensor, the next article behind it will initiate forward motion. Thus, one by one, all of the articles on the conveyor will be restored to conveying mode and ultimately the conveyor will be emptied.

When the supply of pressurized fluid is turned off for the expanders in any particular zone, the spring 47 will automatically bias the upper plate into retracted or downward position. Therefore, there is no reason why the unit should inadvertently become hung up and not shift from conveying to accumulation mode. This assures protection of the articles against inadvertent impact or accumulated line pressure.

It will be understood that each of the valves 64 serves both as an on-off valve for controlling the admission of fluid under pressure to the expanders and as an exhaust port for releasing the fluid from the expanders when they are to be deactivated. For the purpose of noise reduction, the rate at which the expanders are extended and retracted can be dampened by any suitable means such as restricting the size of the inlet and outlet ports.

If the actuators are molded of plastic, the problem of noise is greatly reduced and the reaction speed can be increased accordingly. However, it would still be desirable to dampen the retraction motion to eliminate repeated movement or frequent oscillation of the actuators when the conveyor is operating in conveying mode. This can be done by any of several conventional means such as a check valve in the fluid line which opens fully to admit fluid rapidly to the actuators but closes except for a small restricted by-pass when the control shifts to exhaust.

It is also significant that the total distance the various components of the support assembly have to move is quite short. All of these factors combine to provide a relatively silent operation. It is also important from the economic point of view that the assembly consists of very few parts, those being the upper and lower plates, the actuator subassemblies, the stops and the guideway or track for the propelling member. These are simple and quick to assemble and once put together are basically trouble free because they can be both simple and rugged.

It will be understood that, while a preferred embodiment of this invention has been illustrated and described, that various modifications of the invention can be made. Such of these modifications as incorporate the principles of the invention are to be considered as included in the hereinafter appended claims unless these claims by their language expressly state otherwise.

The embodiments of the invention in which an exclusive property or privilege is claimed are defined as follows:

1. An operator for an accumulator conveyor characterized by a pair of vertically spaced elongated plates superimposed one above the other; means holding the lower one of said plates stationary; an actuator between said plates; said actuator at one end having a footpiece passing through the lower of said plates and pivotally securing said actuator to said lower plate and a hook at the opposite end passing through the upper of said plates and pivotally securing said actuator to said upper plate; expander means mounted on said actuator intermediate its upper and lower ends for forcing said upper plate to separate from said one end of said actuator and causing said upper plate and said actuator to pivot about said footpiece and said hook for moving said plates apart when actuated; means at said one end of said actuator engaging said upper plate for limiting the distance to which said plates can be separated; means on said upper plate for supporting a propelling member.

2. An operator for an accumulator conveyor as described in claim 1 further characterized in that said means at said other end includes a second hook on said actuator extending through said upper plate and a stop detachably secured to said second hook for preventing said second hook from withdrawing through said upper plate.

3. An operator for an accumulator conveyor characterized by a pair of vertically spaced elongated plates superimposed one above the other, means securing the lower one of said plates in a stationary position; a plurality of actuators between said plates arranged in tandem lengthwise thereof; each of said actuators having a pair of ends and a footpiece at the first end hingedly secured to the lower one of said plates; a pair of hook members, one at said first end and the other at the second end extending through the upper one of said plates and having finger portions overlying the top surface of said upper plate; said footpiece and the hook member at the first end being spaced such that said upper plate can be reciprocated vertically between them; expandable means mounted on each of said actuators, said upper plate resting on said expandable means, said expandable means when actuated lifting said upper plate for forcing said plates apart; said footpiece and the hook member at said second end forming a pair of pivots about which the actuator can pivot to inclined position as said plates separate.

4. An operator for an accumulator conveyor as described in claim 3 further characterized in that said upper plate is slotted to permit said hooks to pass therethrough, a pad secured to said hook at said first end, said pad being wider than the slot for said hook for preventing the hook from disengaging said upper plate.

5. An operator for an accumulator conveyor as described in claim 4 further characterized in that said pad is detachably secured to the hook and is plastic to eliminate noise when said plate is engaged by said hook.

6. An operator for an accumulator conveyor as described in claim 4 further characterized in that the lower plate is also provided with a slot to receive the footpiece at said first end; the slot in said upper plate for the hook at said first end being longer than the slots for the footpiece and the hook at the other end whereby the actuator and the plates can be assembled by passing said footpiece and the hook at said other end through their respective slots and the assembly locked together by passing the hook at the first end through its slot and then mounting said pad.

7. An accumulator conveyor having means forming an article conveying surface and an endless driven propelling member, an operator supporting said propelling member from beneath, said operator having elongated upper and lower plates superimposed, one above the other, said upper plate being divided into a plurality of segments arranged in tandem; means securing said lower plate in stationary position; a plurality of actuators arranged in tandem beneath each of said segments and supporting the segment for vertical movement; each of said actuators having a footpiece at one end hingedly secured to the lower one of said plates; a pair of hook members, one at each end extending through the upper one of said plates and having portions overlying the top surface of said upper plate; said footpiece and the hook member adjacent thereto being spaced such that said upper plate can be reciprocated vertically between them; expandable means mounted on each of said actuators, said upper plate resting on said expandable means, said expandable means when actuated lifting said upper plate for forcing said plates apart, said footpiece and adjacent hook member limiting the upward movement of said upper plate, said footpiece and one of said hook members at the end remote from said footpiece being hinges about which the actuators pivot into inclined position as said upper plate is moved toward and away from said lower plate, a source of fluid under pressure connected to all of the actuators, a separate valve between the fluid source and the group of actuators beneath each segment, a plurality of article responsive sensors each operatively connected to one of said valves and each controlling the operation of said actuators.

8. The accumulator conveyor as described in claim 7 further characterized in that the sensor for the actuators of one segment is positioned adjacent the next segment downstream thereof with respect to the direction of movement of articles on said conveyor.

9. The accumulator conveyor as described in claim 18 further characterized in that each actuator has a pair of spaced sides, each side having one of said footpieces and a pair of hooks, said sides connected by a cross bar spaced below said hooks, said expandable means being mounted on said cross bar; a plastic pad secured to each of the hooks on the ends of the sides common to said footpieces for limited separation movement of said plates and eliminating noise during the operation of said actuators.

10. An operator for an accumulator conveyor characterized by a pair of vertically spaced elongated plates superimposed one above the other, a plurality of actuators between said plates arranged in tandem lengthwise thereof; each of said actuators at one end being pivotally engaged with the lower one of said plates and pivotally hooked to the upper one of said plates at the opposite end; means at said one end of each actuator engaging said upper plate for limiting the distance to which said plates can be separated; expander means mounted on each actuator intermediate its upper and lower ends for separating said plates when actuated; a propelling member supported on said upper plate and vertically movable therewith between conveying and accumulation positions.

11. An operator for an accumulator conveyor as described in claim 10 further characterized in that said actuator pivots at one end about a footpiece attachment to said lower plate and pivots at the other end about a hook attachment to said upper plate as said expander means expands and contracts.

* * * * *